United States Patent
Chen et al.

(10) Patent No.: US 6,640,171 B2
(45) Date of Patent: Oct. 28, 2003

(54) MOTOR VEHICLE WITH SUPPLEMENTAL REAR STEERING HAVING OPEN AND CLOSED LOOP MODES

(75) Inventors: Hsien Heng Chen, Troy, MI (US); Karen Ann Boswell, Freeland, MI (US); Edward John Bedner, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/921,634

(22) Filed: Aug. 3, 2001

(65) Prior Publication Data

US 2002/0042671 A1 Apr. 11, 2002

Related U.S. Application Data

(63) Continuation-in-part of application No. 09/825,024, filed on Dec. 15, 2000, now abandoned.
(60) Provisional application No. 60/170,990, filed on Dec. 15, 1999.

(51) Int. Cl.[7] ............................................. G06F 17/00
(52) U.S. Cl. .......................... 701/41; 701/69; 180/408; 180/415
(58) Field of Search .............................. 701/41, 42, 71, 701/69, 94; 180/408, 411, 412, 413, 422, 415

(56) References Cited

U.S. PATENT DOCUMENTS

| | | | | |
|---|---|---|---|---|
| 5,508,921 A | * | 4/1996 | Chikuma et al. | 701/41 |
| 5,648,903 A | * | 7/1997 | Liubakka | 701/41 |
| 5,720,533 A | | 2/1998 | Pastor et al. | 303/147 |
| 5,931,887 A | | 8/1999 | Hac | 701/71 |
| 5,941,919 A | | 8/1999 | Pastor et al. | 701/36 |
| 6,125,319 A | | 9/2000 | Hac et al. | 701/80 |

OTHER PUBLICATIONS

Development of Active Rear Steer System Applying Hoo–II Synthesis; 1998 Society of Automotive Engineers, Inc.; Fujita et al. (month is not available).

* cited by examiner

Primary Examiner—Tan Q. Nguyen
(74) Attorney, Agent, or Firm—Robert M. Sigler (57) ABSTRACT

A rear steer control for a motor vehicle considers vehicle velocity in three ranges and provides an out of phase rear steer angle in open loop control within a low velocity range for oversteer assistance of parking and similar vehicle maneuvers, an in phase rear steer angle in closed loop control responsive to vehicle yaw rate within a high velocity range for understeer vehicle stability assistance, and a steer angle in closed loop control responsive to vehicle yaw rate within an intermediate velocity range. In a preferred embodiment, the closed loop control in the high velocity range may be combined with an open loop control. The control further provides supplemental throttle adjustments in coordination with the rear steer control for increased traction and stability in a turn.

10 Claims, 8 Drawing Sheets

MOTOR VEHICLE WITH SUPPLEMENTAL REAR STEERING HAVING OPEN AND CLOSED LOOP MODES

RELATED APPLICATIONS

This application is a Continuation-in-Part of U.S. Ser. No. 09/825,024, filed Dec. 15, 2000 now abandoned, which references Provisional Application No. 60/170,990, Vehicle Stability Control, filed Dec. 15, 1999.

TECHNICAL FIELD

The technical field of this invention is rear steering for a motor vehicle.

BACKGROUND OF THE INVENTION

Almost all motor vehicles have steering apparatus controlling the front steer angle (the steer angle of the front wheels) of the vehicle to determine the desired direction of vehicle travel. It is also known in the prior art of publications, although physical examples are still rare, to provide supplemental rear wheel steer to provide oversteer assist of low speed vehicle maneuvers such as parking and/or high speed understeer to assist vehicle directional stability. One such system is responsive to vehicle speed to provide an out of phase rear steer angle at low speeds and an in phase rear steer angle at high speeds, with the magnitude of the angle being derived from the front steer angle in an open loop algorithm. But it is not easy to provide optimal control of rear steer angle in a middle range of vehicle speed with such a control.

SUMMARY OF THE INVENTION

The invention described and claimed herein relates to a rear steer control for a motor vehicle that considers vehicle velocity in three ranges and provides an out of phase rear steer angle in open loop control within a low velocity range for oversteer assistance of parking and similar vehicle maneuvers, an in phase rear steer angle in closed loop control responsive to vehicle yaw rate within a high velocity range for understeer vehicle stability assistance and a steer angle in closed loop control responsive to vehicle yaw rate within an intermediate velocity range. In a preferred embodiment, the closed loop control in the high velocity range may be combined with an open loop control. The control optionally provides supplemental throttle adjustments in coordination with the rear steer control for increased traction and stability in a turn.

DESCRIPTION OF THE PREFERRED EMBODIMENT

Figure 1:
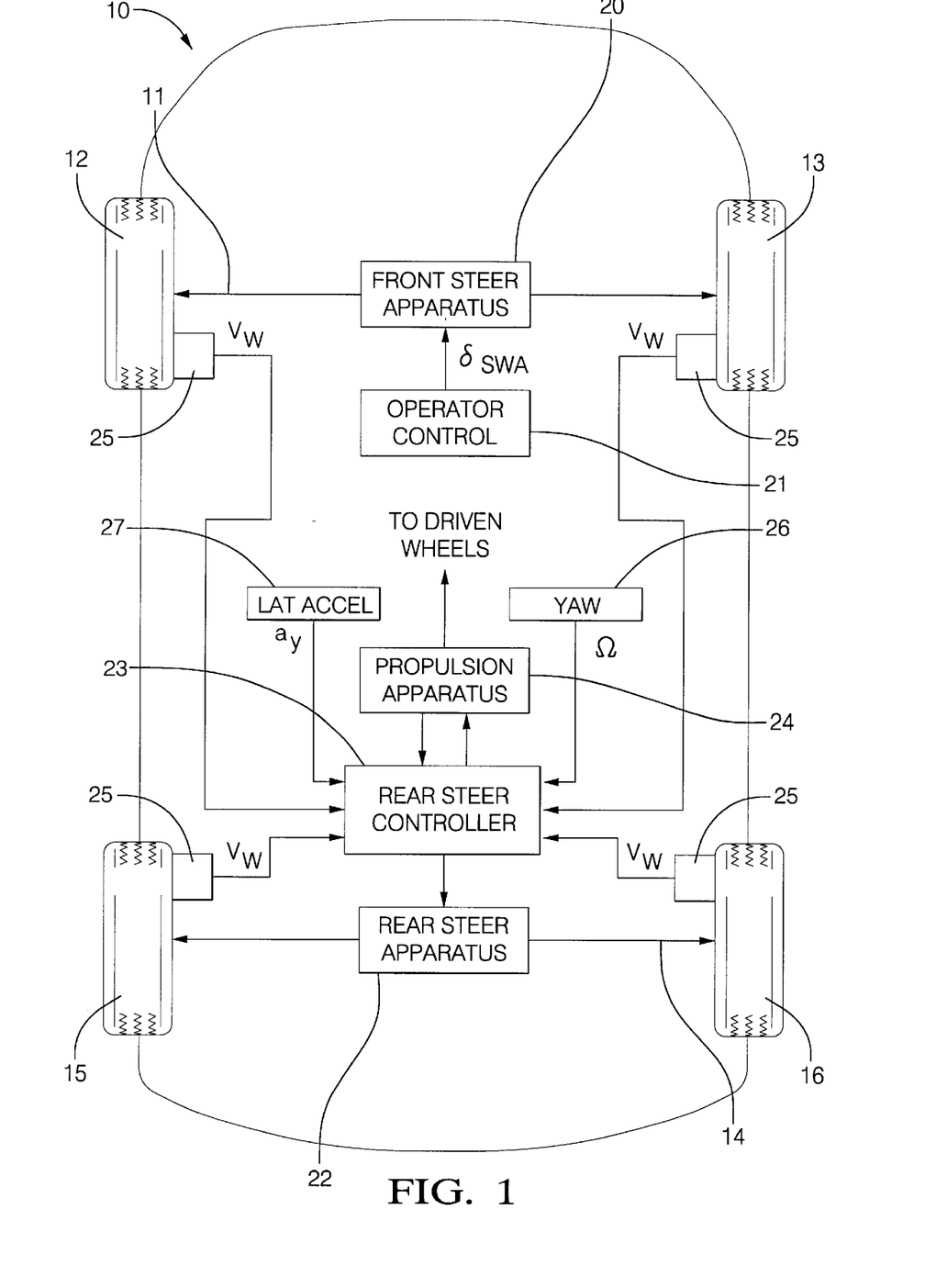
FIG. 1 shows a schematic diagram of a motor vehicle with a rear steer control according to the invention.

Referring to FIG. 1, a motor vehicle 10 has a front axle 11 with left front wheel 12 and right front wheel 13 and a rear axle 14 with left rear wheel 15 and right rear wheel 16. Front wheels 12, 13 are steered by a known front steering apparatus 20 responsive to an operator control 21 such as a standard steering wheel (hand wheel). Front steering apparatus 20 may be mechanical, electro-hydraulic or electric of any known and appropriate construction and operation and provide a front steering angle to front wheels 12, 13. For example, front steering apparatus 20 may preferably be a standard rack and pinion steering apparatus with power assist; and front wheels 12, 13 may be steered to a common steering angle. Rear wheels 15, 16 are steerable by a rear steer apparatus 22 controlled by a rear steer control 23 of this invention to supplement the steering action of front wheels 15 and 16 as described herein. A vehicle propulsion apparatus 24 provides motive power to at least one of the pairs of front wheels 12, 13 (front wheel drive) or rear wheels 15, 16 (rear wheel drive).

Rear steer control 23 preferably includes a microcomputer based controller receiving inputs from several sensors on vehicle 10. Front steer apparatus 20 includes a steering wheel angle sensor that measures the operator steering input and outputs a steering wheel angle signal $\delta_{SWA}$. Wheel speed sensors 25 on each of the non-driven wheels provide wheel speed signals $V_W$ that can be averaged to provide a longitudinal vehicle velocity signal $V_X$. Alternatively, this signal may be provided by any other known vehicle speed sensor, especially if all wheels are driven. A yaw rate sensor 26 provides a vehicle yaw rate signal $\Omega$, and a lateral acceleration sensor 27 provides a vehicle lateral acceleration signal $a_y$. A throttle input signal is provided by propulsion apparatus 24.

Figure 2:
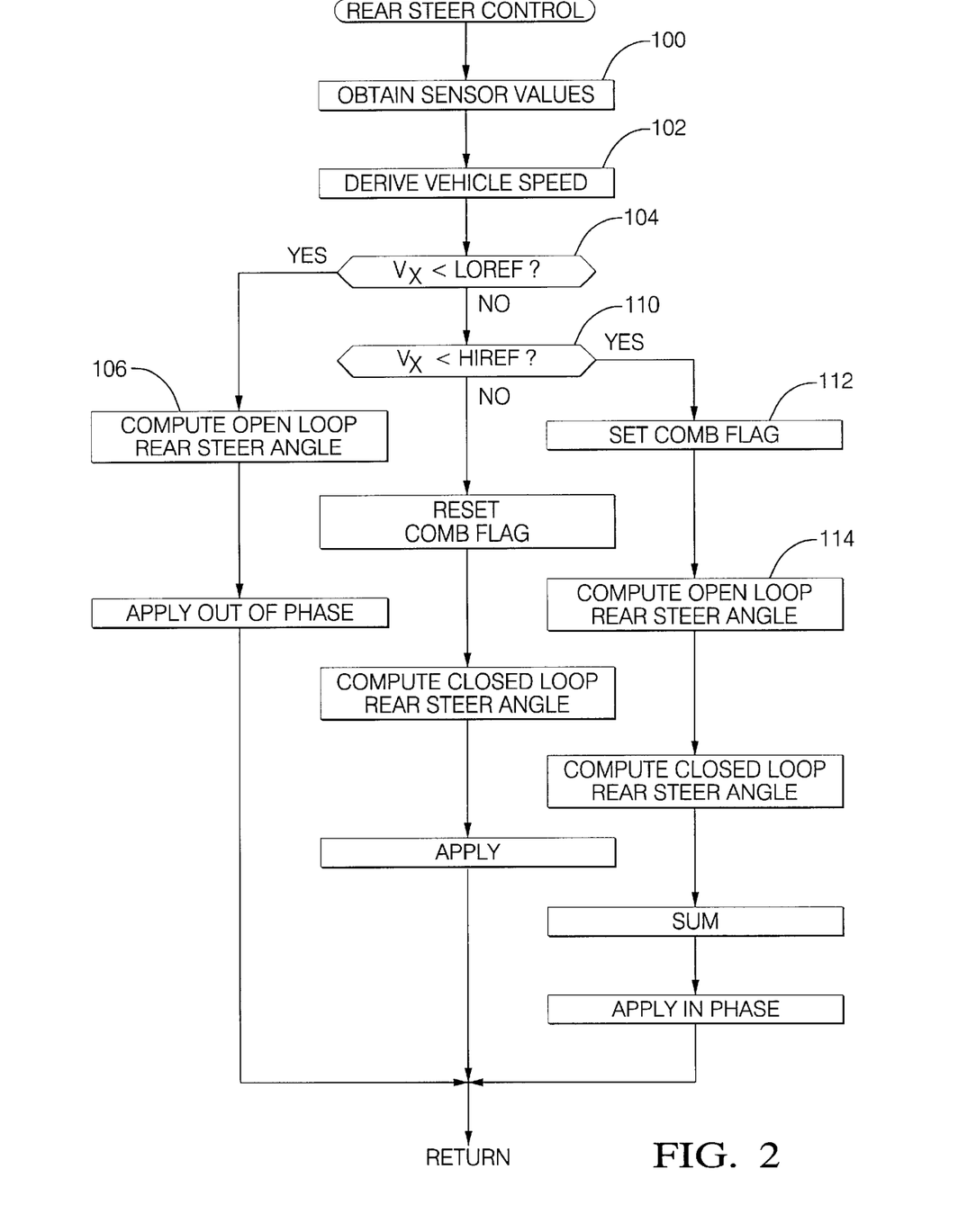
FIG. 2 shows a flow chart of a rear steer control for use in the vehicle of FIG. 1.

Subroutine REAR STEER COMMAND, the rear steer control for vehicle 10, is provided to vehicle 10 in the form of a stored computer program to be run by the microcomputer therein and is shown in flow chart form in FIG. 2. It begins at step 100 by obtaining sensor values from the steering wheel angle sensor in front steer apparatus 20, the wheel speed sensors 25 on the non-driven wheels, the lateral acceleration sensor 27 and the yaw rate sensor 26. It continues at step 102 by deriving a vehicle speed signal $V_X$, for example by averaging the sensed wheel speeds of the non-driven wheels. Thus, signals for measured yaw rate $\Omega$, measured lateral acceleration $a_y$, throttle input and individual wheel speeds $V_W$ are available for use in the remainder of the subroutine.

Figure 5:
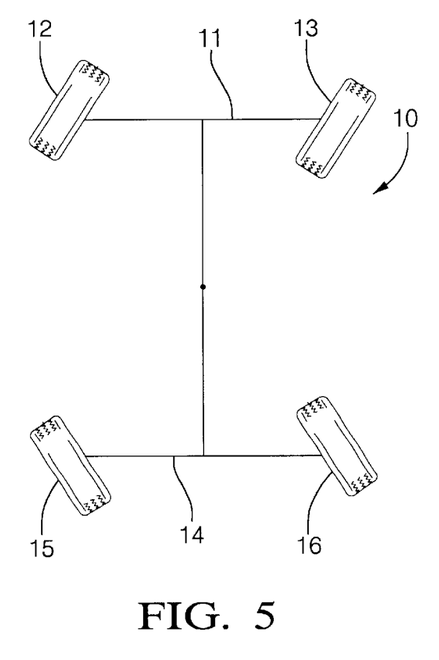

At step 104, the subroutine compares the derived vehicle speed signal $V_X$ with a low speed reference LOREF, for example 10 miles per hour (mph). If $V_X$ is less than reference LOREF, the subroutine calls another subroutine OPEN LOOP at step 106. Subroutine OPEN LOOP, which will be described in greater detail below, derives an open loop rear steer angle command from a front steer angle and the value of vehicle speed $V_X$. The rear steer angle command is applied, at step 108, out of phase with the front steer angle. In this document, the phrase "out of phase" applied to the rear steer angle means that the rear steer angle is measured from the straight ahead direction in opposite rotation to that of the front steer angle. This is shown schematically in FIG. 5, in which front wheels 12, 13 are turned to the right and rear wheels 15, 16 are turned to the left, although the angle is exaggerated for ease of understanding. The out of phase rear steer provides a supplemental oversteer to assist in parking and other low speed maneuvers.

Figure 4:
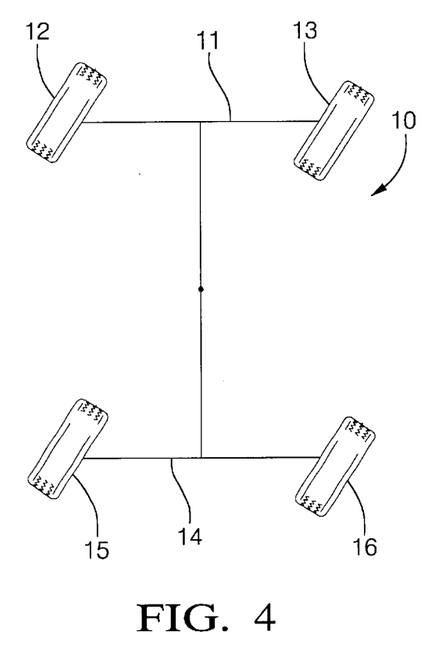
FIGS. 4 and 5 are schematic diagrams demonstrating in phase and out of phase rear steering.

Returning to step 104, if signal $V_X$ is not less than LOREF, the subroutine compares it to a high reference HIREF, for example 30 mph, at step 110. If the value of $V_X$ exceeds HIREF, the subroutine sets a flag COMB at step 112 to indicate combined open loop and closed loop and calls subroutine OPEN LOOP at step 114 to provide an open loop rear steer angle command. The subroutine then calls a subroutine CLOSED LOOP at step 116. Subroutine CLOSED LOOP, which will be described in greater detail below, derives a closed loop rear steer angle command in response to computed yaw rate and side slip rate errors. Subroutine REAR STEER COMMAND next adds the open and closed loop rear steer angle commands provided by subroutines OPEN LOOP and CLOSED LOOP at step 118 and applies the resulting combined rear steer angle command in phase at step 120. The phrase "in phase" applied to the rear steer angle command means the opposite of "out of phase": that is, measured in the same rotation as that of the front steer angle, as shown schematically in FIG. 4, in which both the front wheels and the rear wheels are turned to the right. The in phase rear steer provides a supplemental understeer at high vehicle speeds to promote directional stability. The combination of open loop and closed loop control provides the ability to operate with the open loop value alone if the closed loop value becomes unavailable.

Returning to step 110, if the value of $V_X$ is not greater than HIREF, the COMB flag is reset at 122; and subroutine CLOSED LOOP is called at step 124. The output closed loop rear steer angle command is then applied at step 126, in or out of phase as determined by the subroutine. Thus, in the intermediate range between HIREF and LOREF (e.g. 10–30 mph), an out of phase supplemental rear steer is provided but is limited in closed loop responsive to yaw rate and side slip errors to enhance stability in the upper part of the range.

Figure 3:
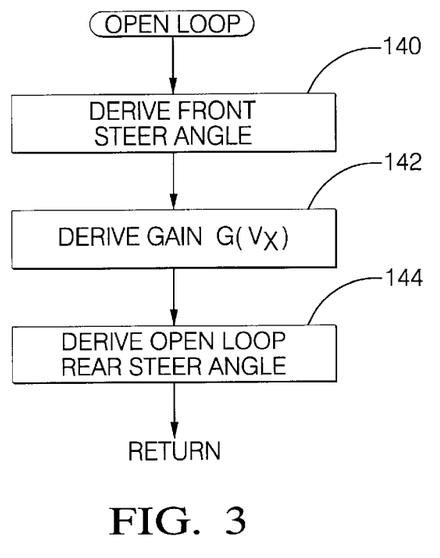
FIG. 3 shows a flow chart of a subroutine used in the control program of FIG. 2.

Subroutine OPEN LOOP is described with reference to the flow chart of FIG. 3. It begins at step 140 by deriving a FRONT STEER ANGLE which is the angle between the front wheels and the longitudinal vehicle axis. In the case of a standard rack and pinion or other mechanical steering apparatus, this is easily accomplished by multiplying the steering wheel (hand wheel) angle $\delta_{SWA}$ by a gain representing the gear ratio of the front steering apparatus:

FRONT STEER ANGLE=$\delta_{SWA}/K_F$.

At step 142, a vehicle velocity dependent gain $G(V_X)$ is obtained, preferably from a lookup table with longitudinal vehicle velocity $V_X$ as an input. At step 144, the REAR STEER ANGLE COMMAND is generated by multiplying the FRONT STEER ANGLE derived in step 140:

REAR STEER ANGLE COMMAND=$G(V_X)$*(FRONT STEER ANGLE).

The sign of gain G(VX) may be conveniently chosen to ensure an out of phase rear steer angle command.

Figure 6A:
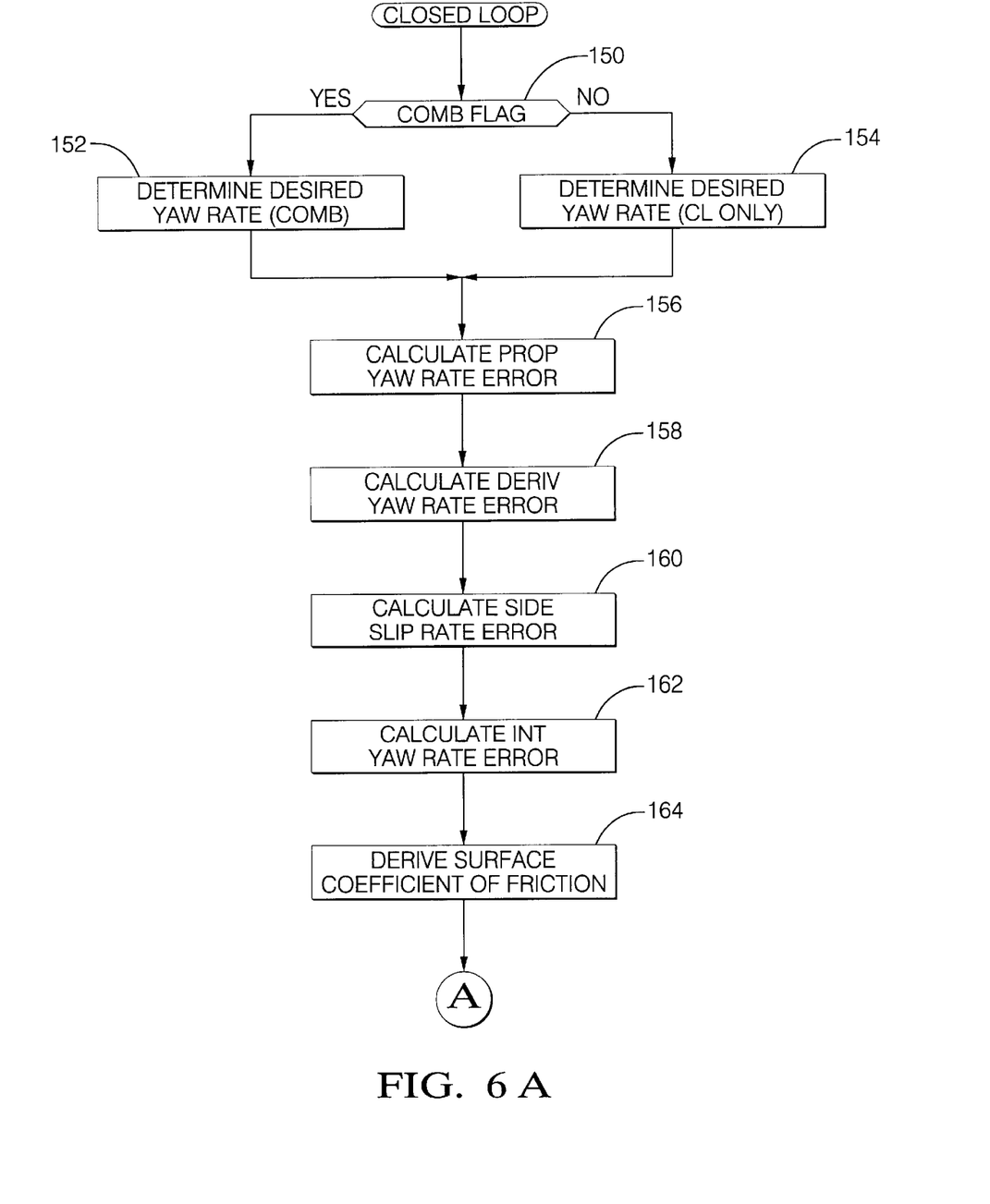
FIGS. 6A, 6B, and 7–11 are flow charts of additional subroutines used in the control program of FIG. 2.
Figure 6B:
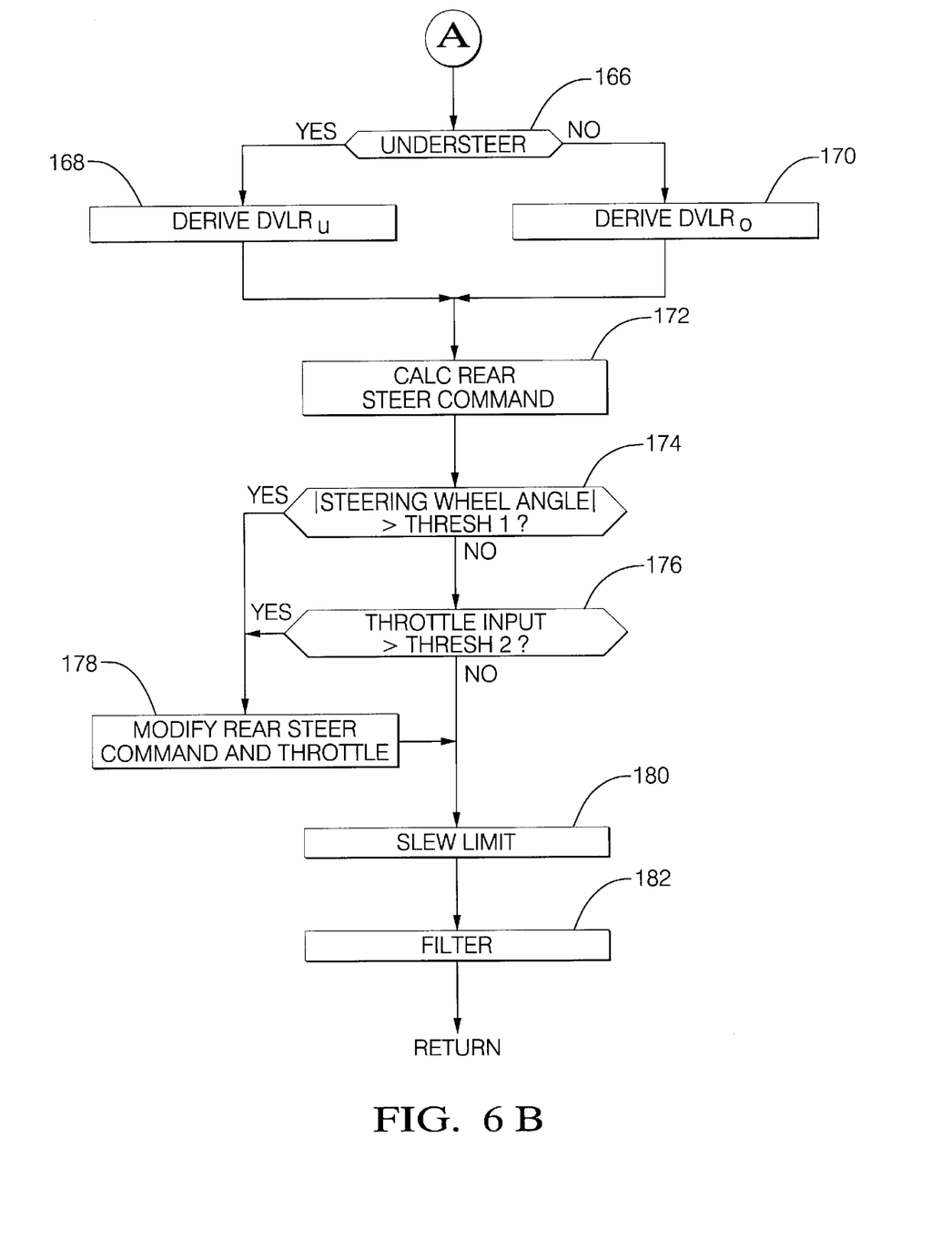

Subroutine CLOSED LOOP is described with reference to the flow chart of FIGS. 6A, 6B. It begins at step 150 by checking the COMB flag to determine whether the mode of operation is combined closed and open loop (in the high range of vehicle velocity) or closed loop only (in the intermediate range of vehicle velocity). If the flag is set the combined mode is indicated; and the subroutine determines a desired closed loop yaw rate at step 152 in a table lookup using a table stored for use in the combined mode. The table stores values of desired yaw rate as a function of longitudinal vehicle velocity $V_X$ and FRONT STEER ANGLE. If the COMB flag is found to be reset at step 150, the closed loop only mode is indicated; and the subroutine proceeds to step 154 and performs a table lookup of desired yaw rate in a similar table storing values appropriate for the closed loop only mode.

From either of steps 152 and 154, the subroutine next calculates a proportional yaw rate error signal PYAWERR at step 156 as the difference between the determined desired yaw rate $\Omega_d$ and the measured yaw rate $\Omega$:

PYAWERR=$\Omega_d$-$\Omega$.

At step 158, the subroutine calculates a derivative yaw rate error signal DYAWERR by differentiating PYAWERR:

DYAWERR=$d/dt(\Omega_d$-$\Omega)$.

In digital terms, this can be done by determining the difference between present and previous values of PYAWERR:

DYAWERR$_n$=PYAWERR$_n$-PYAWERR$_{n-1}$.

At step 160, the subroutine calculates a side slip rate error term, which is simplified by an assumption that the desired side slip rate equals zero. The side slip rate error term is then just the negative of the actual side slip rate:

SLIPRATERR=-$(a_y$-$\Omega$*$V_X)$.

At step 162, the subroutine calculates an integral yaw rate error term, which can be accomplishes in digital terms as an accumulated sum:

IYAWERR$_n$=IYAWERR$_{n-1}$+PYAWERR$_n$, in which IYAWERR$_n$ is the present value of the integral of the yaw rate error, IYAWERR$_{n-1}$ is the previous value thereof, and PYAWERR$_n$ is the present value of the yaw rate error.

At step 164, the subroutine calls another subroutine SURFACE COEFFICIENT to derive an estimated surface coefficient of friction of the road surface. The latter subroutine will be described in more detail below. In step 166, the subroutine determines whether the vehicle is in an understeer or an oversteer mode. The determination of oversteer or understeer is well known in the art and is used in many vehicle yaw stability controls in use in production vehicles and shown in patents such as one or more of U.S. Pat. Nos. 6,122,584, 5,720,533, 5,746,486 and 5,941,919.

If the result of step 166 is a determination of understeer, the subroutine proceeds to calculate a commanded DVLR for the rear wheels at step 168. DVLR, also symbolized as $\Delta V_{LR}$, is a commanded difference between the right and left wheel velocities. In the case of understeer, DVLR$_U$ is equal to a weighted sum of the proportional yaw rate error term, the derivative yaw rate error term and the integral yaw rate error term:

DVLR$_U$=$G_{PU}$*PYAWERR+$G_{DU}$*DYAWERR+$G_{IU}$*IYAWERR in which gains $G_{PU}$, $G_{DU}$ and $G_{IU}$ and are stored in memory as functions of the estimated surface coefficient of friction $\mu_e$, generally decreasing with increasing $\mu_e$. Also, the integral yaw rate error term is reset to zero before calculating DVLRU if any of the following conditions is met:

(1) the absolute value of the proportional yaw rate error is less than a threshold value, (2) the product of the yaw rate error and the yaw rate error integral is negative (thus they have opposite signs), or (3) $\Delta V_{LR}$ (measured velocity difference between right and left wheels) for either the front or rear wheels is greater than a threshold, indicating a difference in surface coefficient between the left and right wheels (split $\mu$ condition).

Returning to step 166, if the vehicle is in oversteer, the subroutine proceeds to step 170, in which it calculates a commanded DVLR for the rear wheels as a weighted sum of the proportional yaw rate error term, the derivative yaw rate error term and a slip rate error term:

$$DVLR_O = G_{PO}*PYAWERR + G_{DO}*DYAWERR - G_{SO}*SLIPRATERR$$

As in the case of understeer, the gains $G_{SO}$, $G_{PO}$ and $G_{DO}$ are stored in memory as functions of surface coefficient $\mu_e$, generally decreasing with increasing $\mu_e$.

After DVLR is calculated for understeer or oversteer in one of steps 168 and 170, the subroutine proceeds to step 172, in which a REAR STEER ANGLE COMMAND is derived by multiplying DVLR by a calibrated constant conversion factor having a negative sign and a magnitude dependent on the vehicle chassis geometry and tire properties (example, −0.5). In one embodiment of this invention, step 172 would be followed by slew rate limiting and filtering the REAR STEER COMMAND and then returning from the subroutine. But in this embodiment, an supplemental modification is included. After step 172, the subroutine proceeds to compare the magnitude of the steering wheel angle (indicative of driver steer input) with a first threshold THRESH1 at step 174. If it is not greater than the threshold, the subroutine proceeds to compare the driver throttle input with a second threshold THRESH2. If it is not greater than the threshold, the subroutine proceeds to slew limit (step 180) and filter (step 182) the REAR STEER COMMAND and return. But if the answer is yes (greater than) in either of steps 174 and 176, the subroutine proceeds to modify the REAR STEER COMMAND and perhaps send a throttle modification to propulsion apparatus 24 before proceeding to step 180.

Figure 8:
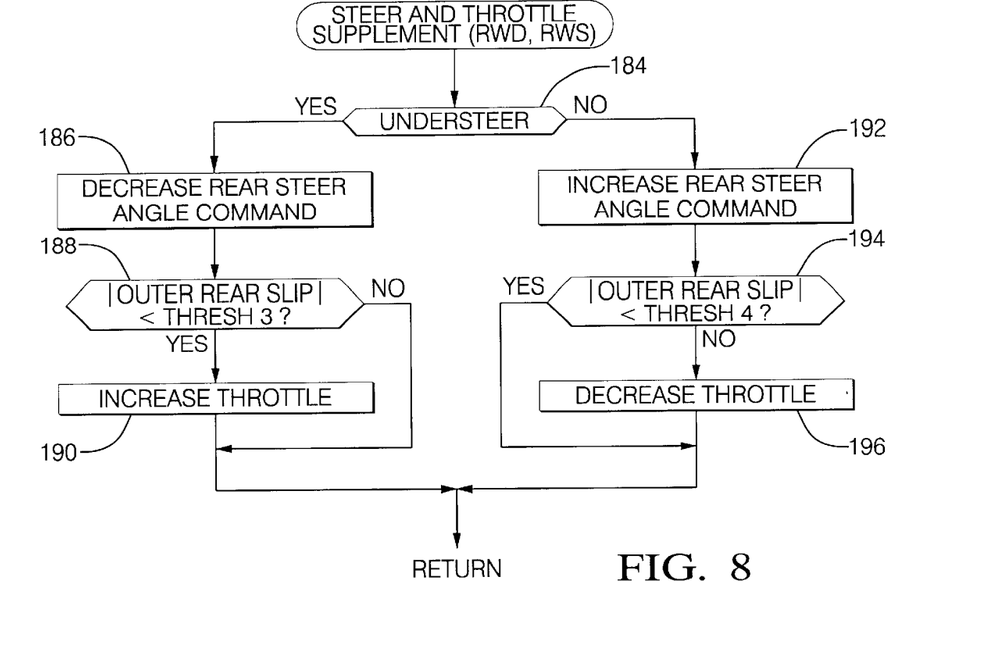

The modification of step 178 in the previous paragraph is described as an additional subroutine in the flow chart of FIG. 8, which shows a particular modification for a vehicle with rear wheel propulsion and supplemental rear wheel steer. Subroutine STEER AND THROTTLE SUPPLEMENT (RWD, RWS) begins by determining an understeer mode at step 184. If understeer is indicated, the subroutine decreases REAR STEER ANGLE COMMAND for the rear wheels by a predetermined value at step 186. The subroutine then determines at step 188 if the absolute value of the outer rear wheel slip is less than a threshold THRESH3. If it is, a command is sent at step 190 to propulsion apparatus 24 to increase the throttle command by a predetermined value. If the absolute value of the outer rear wheel slip is not less than THRESH3, step 190 is skipped. Returning to step 184, if oversteer is indicated, REAR STEER ANGLE COMMAND is increased at step 192 for the rear wheels by a predetermined value. At step 194, the absolute value of the outer rear slip is compared with a threshold THRESH4 and, if it is not less, a command to decrease the throttle command by a predetermined value is sent at step 196 to propulsion control 24.

Figure 9:
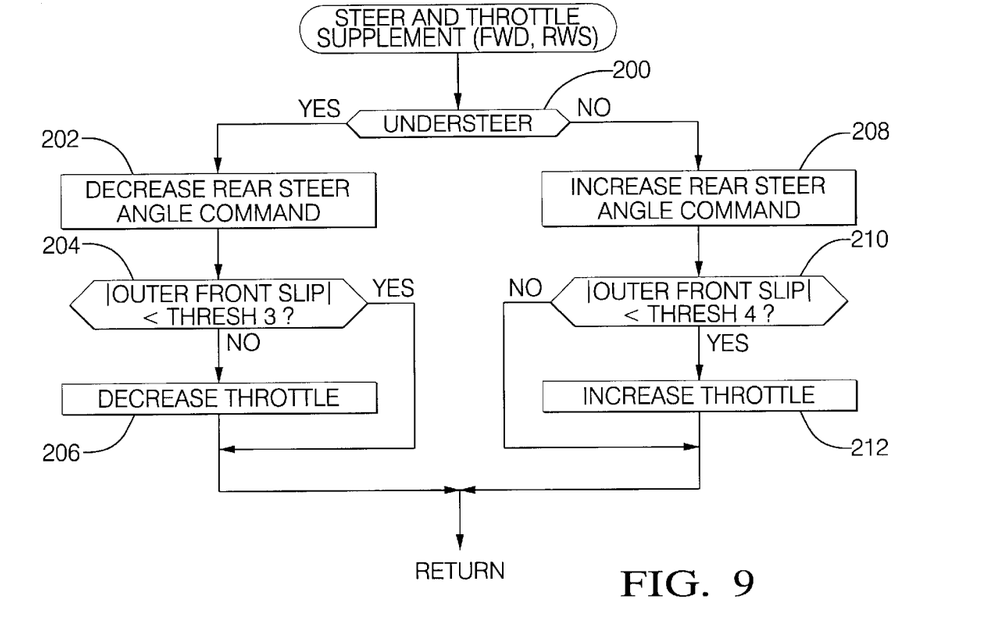

FIG. 9 describes the modification of step 178 for a vehicle with front wheel propulsion and supplemental rear wheel steer. Subroutine STEER AND THROTTLE SUPPLEMENT (FWD, RWS) begins by determining an understeer mode at step 200. If understeer is indicated, the subroutine decreases REAR STEER ANGLE COMMAND for the rear wheels by a predetermined value at step 202. The subroutine then determines at step 204 if the outer front wheel slip is less than a threshold THRESH3. If it is not less, a command is sent at step 206 to propulsion apparatus 24 to decrease the throttle command by a predetermined value. If the outer front wheel slip is less than THRESH3, step 206 is skipped.

Returning to step 200, if oversteer is indicated, REAR STEER ANGLE COMMAND is increased at step 208 for the rear wheels by a predetermined value. At step 210, the outer front slip is compared with a threshold THRESH4 and, if it is less, a command to increase the throttle command by a predetermined value is sent at step 212 to propulsion control 24.

Figure 10:
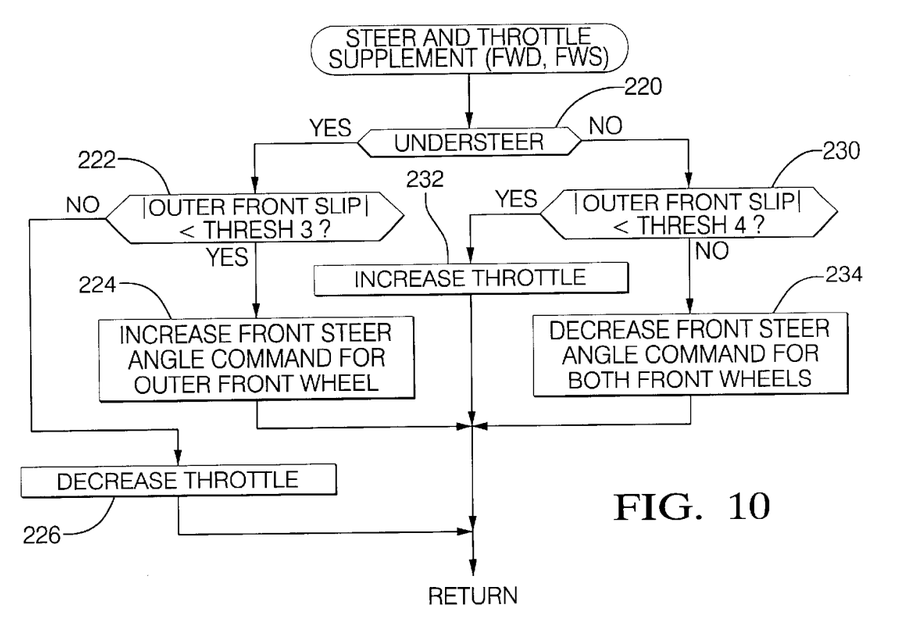
Figure 11:
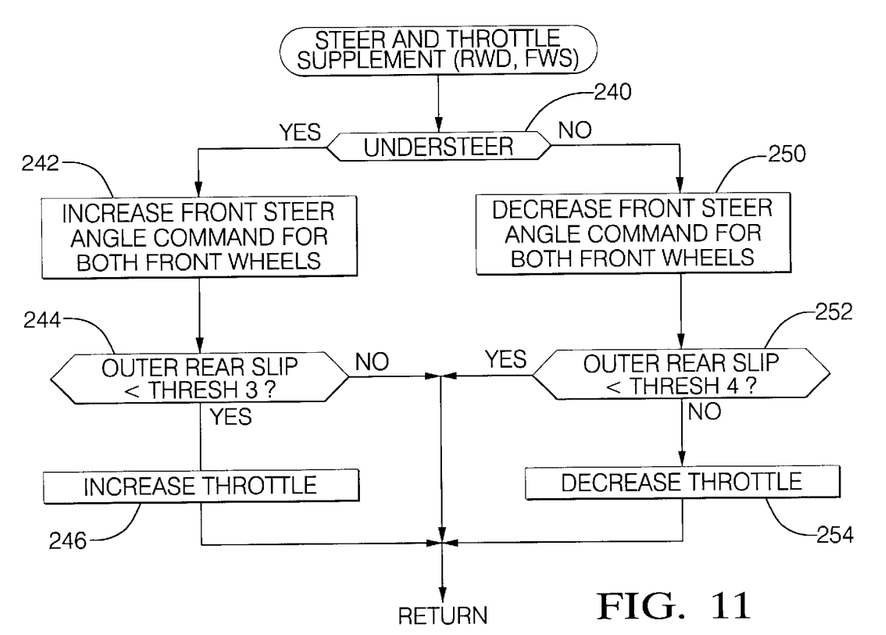

FIGS. 10 and 11 describe variations of the modification of step 178 for a vehicle with an electronically controlled front steering apparatus 20 and may be used in a vehicle that does not have rear wheel steering. The front steering apparatus may be any type of steering apparatus providing independent steer angle control of each of the front wheels in an automatic manner relative to operator input, such as in response to an electronic command signal.

Referring to FIG. 10, for front wheel drive and front wheel steering control, subroutine STEER AND THROTTLE SUPPLEMENT (FWD, FWS) begins by determining an understeer mode at step 220. If understeer is indicated, the subroutine determines at step 222 if the magnitude of the outer front wheel slip is less than a threshold THRESH3. If this is true, then the subroutine increases a FRONT STEER ANGLE COMMAND for the outer front wheel at step 224. If it is not true, then a command is sent at step 226 to propulsion apparatus 24 to decrease the throttle command by a predetermined value. Returning to step 220, if oversteer is indicated, the subroutine determines at step 230 if the outer front wheel slip is less than a threshold THRESH4. If it is true, a command to increase the throttle command by a predetermined value is sent at step 232 to propulsion control 24. If it is not true, the subroutine decreases a FRONT STEER ANGLE COMMAND to both front wheels at step 234.

Referring to FIG. 11, for rear wheel drive and front wheel steering control, subroutine STEER AND THROTTLE SUPPLEMENT (FWD, FWS) begins by determining an understeer mode at step 240. If understeer is indicated, the subroutine increases a FRONT STEER ANGLE COMMAND for both front wheels at step 242 and then determines at step 244 if the magnitude of the outer rear wheel slip is less than a threshold THRESH3. If this is true at step 244, then a command is sent at step 246 to propulsion apparatus 24 to increase the throttle command by a predetermined value. If it is not true, then step 246 is skipped. Returning to step 240, if oversteer is indicated, the subroutine decreases a FRONT STEER ANGLE COMMAND to both front wheels at step 250 and then determines at step 252 if the outer rear wheel slip is less than a threshold THRESH4. If it is not true at step 252, a command to decrease the throttle command by a predetermined value is sent at step 254 to propulsion control 24. If it is true, step 254 is skipped.

Subroutine SURFACE COEFFICIENT is described with reference to FIG. 7, which show a flow chart of subroutine SURFACE COEFFICIENT. This subroutine calculates an estimated surface coefficient of adhesion $\mu_e$. Generally, the subroutine is designed to recognize situations when vehicle 10 operates at or close to the limit of adhesion and estimate a lateral surface coefficient of adhesion $\mu_L$ from measured lateral acceleration $a_y$. This estimate is calculated by identifying the one of the following three conditions.

First, entry conditions are when vehicle 10 is handling at the limit of adhesion and is not in a quick transient maneuver. Under entry conditions, the coefficient of adhesion is calculated as a ratio of the magnitude of lateral acceleration $a_y$ to the maximum lateral acceleration $a_{ymax}$ that vehicle 10 can develop on dry surface.

Second, reset conditions indicate vehicle 10 is well below the limit of adhesion (within the linear range of handling behavior). The surface estimate is set to the default value of 1.

Third, when neither the entry conditions nor the reset conditions are identified, the surface estimate is held unchanged from a previous value (i.e. holding conditions). The only exception is when the magnitude of measured lateral acceleration $a_y$ exceeds the maximum value predicted using currently held estimate. In this case the estimate is calculated as if vehicle 10 was in an entry condition.

The subroutine begins at step 60 by obtaining certain information. It is recognized that the most robust signal available is yaw rate $\Omega$, and the entry and exit conditions are dependent mainly on a yaw rate error, i.e. a difference between the desired yaw rate $\Omega_d$ and measured yaw rate $\Omega$, and to a lesser extent on measured lateral acceleration $a_y$ (entry condition only). Thus, the yaw rate error $\Omega_d - \Omega$ and lateral acceleration $a_y$ are obtained as described above and filtered.

Next, at step 61, a temporary surface coefficient $\mu_{L\_temp}$ is derived. When vehicle 10 reaches the limit of adhesion in a steady turn, a surface coefficient of adhesion can be determined as a ratio of the magnitude of a filtered lateral acceleration $a_{yfilt}$ to a maximum lateral acceleration $a_{ymax}$ that vehicle 10 can sustain on dry pavement as shown in the following equation:

$$\mu_{L\_ay} = |a_{yfilt}|/a_{ymax}$$

where $\mu_{L\_ay}$ is an intermediate, temporary estimate of surface coefficient of adhesion in the lateral direction, and $a_{yfilt}$ is filtered lateral acceleration, which is also corrected for the effects of measured gravity components resulting from vehicle body roll and bank angle of the road.

Because of the effects of load transfer to the outside wheels during cornering, which is smaller on slippery surfaces than on dry roads, lateral acceleration $a_y$ is not directly proportional to the surface coefficient of adhesion $\mu_L$. To account for this effect, the surface estimate $\mu_{L\_temp}$ computed from the previous equation is corrected using the following equation:

$$\mu_L = \mu_{L\_ay} * (c_1 + c_2 * \mu_{L\_ay})$$

where $c_1 < 1$ and $c_2 = 1 - c_1$, so that on dry surface $\mu_L = \mu_{L\_temp} = 1$, while on slippery surfaces $\mu_L < \mu_{L\_temp}$. Example values are $c_1 = 0.85$ and $c_2 = 0.15$.

In order to allow lateral acceleration $a_y$ to fully build up at the beginning of a maneuver and after each change in sign, before it can be used for estimation of surface coefficient $\mu_L$, a condition is used that requires both the desired yaw rate $\Omega_d$ and lateral acceleration $a_y$ to have the same signs for a specific time period (necessary for the acceleration to build up). In order to keep track of how long the desired yaw rate $\Omega_d$ and lateral acceleration $a_y$ have had the same signs, a timer is introduced, for example based on a timer interrupt from a real time clock. In accordance with the following equation, the timer becomes zero when the desired yaw rate $\Omega_d$ and lateral acceleration $a_y$ have opposite signs and counts the time that elapses from the moment the signs become and remain the same.

$$timer = \begin{cases} 0 & \text{when } \Omega_d * a_{yfilt} < Ay\_sign\_comp \\ timer + loop\_time & \text{otherwise} \end{cases}$$

where $\Omega_d$ is the desired yaw rate in [rad/s] and $Ay\_sign\_comp$ is a constant with a typical value of 0.2 m/s$^3$. The variable $a_{yfilt1}$ is the filtered lateral acceleration, $a_{yfilt}$, whose magnitude is limited according to the following equation:

$$a_{yfilt1} = \begin{cases} a_{yfilt} & \text{if } |a_{yfilt}| \geq a_{ymin} \\ a_{ymin} * sign(\Omega_d) & \text{if } |a_{yfilt}| < a_{ymin} \end{cases}$$

where $a_{ymin}$ is a constant with a typical value of 0.2 m/s$^2$. Thus if $a_{yfilt}$ is very small in magnitude, it is replaced by the $a_{ymin}$ with a sign the same as the desired yaw rate $\Omega_d$. This limit is needed to improve estimation on very slick surfaces (e.g. ice) when the magnitude of lateral acceleration $a_y$ is comparable to the effect of noise, so that the sign of $a_{yfilt}$ cannot be established.

Subroutine SURFACE COEFFICIENT finds the entry conditions to be met at step 62 when the following three (3) conditions are simultaneously satisfied. The first condition deals with the size of the magnitude of yaw rate error. Either (1) the magnitude of the yaw rate error is greater than a threshold:

$$|\Omega_d - \Omega|_{filt} > Yaw\_Threshold1$$

where the typical value of Yaw_Threshold1 is 0.123 rad/s=7 deg/s); or (2) the magnitude of yaw rate error is greater than a lower threshold Yaw_Threshold2 for some time Te as computed in the following equation:

$$|\Omega_d - \Omega|_{filt} > Yaw\_Threshold2 \text{ for Te seconds}$$

where Yaw_Threshold2 depends on the magnitude of desired yaw rate $\Omega_d$ or measured yaw rate $\Omega$. For example, Yaw_Threshold2=4 deg/s+5*$|\Omega_d|$=0.07 rad/s+0.09*|YR_Des|, where $\Omega_d$ is the desired yaw rate in [rad/s]. A typical value of the time period Te for which this condition must be satisfied is 0.3 sec. The threshold Yaw_Threshold1 used may also depend on the magnitude of desired yaw rate $\Omega_d$ or measured yaw rate $\Omega$.

The second condition is that the signs of the measured lateral acceleration $a_y$ and filtered lateral acceleration $a_{yfil}$ and a weighted sum of yaw rate $\Omega$ and the derivative of yaw rate are the same in accordance with the following mathematical expression:

$$a_{yfilt1} * (\Omega + Yaw\_Der\_Mult * d\Omega/dt) > Sign\_Comp$$

where $\Omega$ is the measured yaw rate and $d\Omega/dt$ is its derivative. The recommended values for the constant Yaw_Der_Mult is 0.5 and for Sign_Comp is 0.035 (if $\Omega$ is in rad/s and $d\Omega/dt$ in rad/s$^2$).

The third condition is that either (1) the signs of the desired yaw rate $\Omega_d$ and measured lateral acceleration $a_y$ are the same and they have been the same for some time in accordance with following equation:

$$timer > hold\_time$$

where hold_time can be 0.25 s, or (2) the magnitude of a derivative of lateral acceleration $da_y/dt$ is less than a threshold in accordance with the following mathematical equation (45):

$$|da_y/dt| < Ay\_Der\_Thresh$$

A recommended value of the threshold, $Ay\_Der\_Thresh = 2.5$ m/s$^3$. The derivative $da_y/dt$ is obtained by passing filtered lateral acceleration $a_{yfil}$ through a high pass filter with a transfer function $a_f * s/(s + a_f)$ with a typical value of $a_f = 6$ rad/s.

When the entry conditions are met, the subroutine proceeds to step 64 and determines the surface coefficient to be the temporary surface estimate $\mu_L$ as described above and then proceeds to step 66. When the entry conditions are not met, the subroutine skips step 64 and proceeds directly to step 66.

At step 66, the subroutine tests the exit conditions. The exit conditions are met when the following two (2) conditions are simultaneously satisfied. The first condition is the magnitude of yaw rate error as filtered is less than or equal to a threshold as illustrated in the following equation:

$$|\Omega_d - \Omega|_{filt} \leq Yaw\_Threshold3$$

with a typical value of Yaw_Threshold3=0.10 rad/s.

The second condition is that a low-pass filtered version of the magnitude of the yaw rate error is less than or equal to a threshold as illustrated in the following equation:

$$(|\Omega_d - \Omega|_{filt})_{filt} \leq Yaw\_Treshold4$$

where the value of Yaw_Threshold4=0.06rad/s is recommended and the filter is a first order filter with a cutoff frequency of 1.8 rad/s, e.g. a filter with a transfer function $a_f/(s+a_f)$ with $a_f=1.8$ rad/s). The thresholds Yaw_Threshold3 and Yaw_Thereshold4 may depend on the magnitude of desired yaw rate $\Omega_d$ the measured yaw rate $\Omega$.

When the exit conditions are met, the subroutine proceeds to step 68 to reset the corrected surface estimate $\mu_L$ to 1. When the exit conditions are not met, the subroutine proceeds to step 70 to set $\mu_L$ equal to the greater of the previous estimate of surface estimate $\mu_L$ or the temporary surface estimate $\mu_{L\_temp}$ $$\mu_{L(n)} = \max\{\mu_{L(n-1)}, \mu_{L\_temp}\}$$

At step 72, surface estimate $\mu_L$ is limited from below by a value $\mu_{Lmin}$ (a typical value 0.07) and may be limited from above by $\mu_{Lmax}$ (a typical value 1.2). Surface estimate $\mu_L$ can be passed through a slew filter, which limits the rate of change of the estimate to a specified value, for example 2/sec, or a low pass filter.

Figure 7:
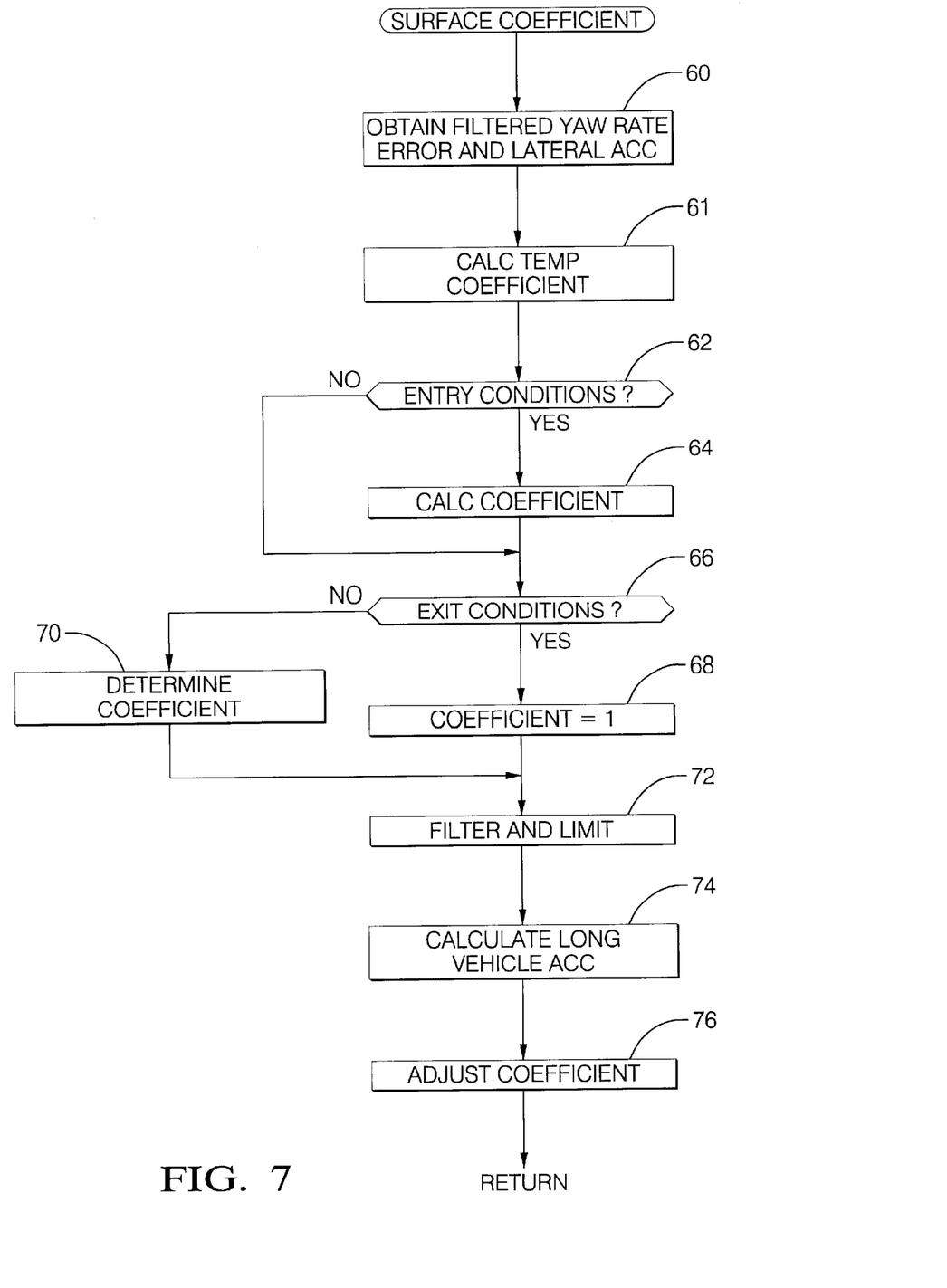

Referring still to FIG. 7, at step 74, an estimate of a longitudinal acceleration $a_{xe}$ is calculated by differentiating or high pass filtering the vehicle speed $V_X$. At step 76, the coefficient is adjusted responsive to the estimated longitudinal acceleration:

$$\mu_e = \begin{cases} \mu_{Lfilt} & \text{when } |a_{xe}| \leq Ax\_Dz \\ \{(\mu_{Lfilt})^2 + [(|a_{xe}| - Ax\_Dz)/a_{xmax}]^2\}^{1/2} & \text{when } |a_{xe}| > Ax\_Dz \end{cases}$$

where Ax_Dz is the dead-zone applied to the estimated longitudinal acceleration (a typical value is 2 m/s$^2$) and axmax is a maximum longitudinal deceleration which the vehicle can achieve on a dry surface (a typical value is 9 m/s$^2$). The square root function in the above expression can be replaced by a simplified linear equation or by a lookup table. The estimate is finally limited from below by a value $\mu_{emin}$ (a typical value 0.02) and may be limited from above by $\mu_{emax}$ (a typical value 1.0).

What is claimed is:

1. A method for controlling a steerable rear wheel in a motor vehicle having one or more operator steered front wheels, comprising the steps:

measuring longitudinal vehicle velocity;

measuring a front steer angle;

if the measured longitudinal vehicle velocity is within a predetermined low velocity range, deriving a first rear steer angle command in open loop responsive to the measured longitudinal vehicle speed and front steer angle and applying the first rear steer angle command to the steerable rear wheel out of phase with the front steer angle;

if the measured longitudinal vehicle velocity is within a predetermined high speed range higher than the low velocity range, deriving a second rear steer angle command in closed loop responsive at least to yaw rate error and applying the second rear steer angle command to the steerable rear wheel in phase with the front steer angle; and if the measured longitudinal vehicle velocity is within an intermediate velocity range between the high velocity range and the low velocity range, deriving a third rear steer angle command in closed loop responsive at least to yaw rate error and applying the third rear steer angle command to the steerable rear wheel.

2. The method of claim 1 wherein the step of deriving a second rear steer angle further includes the steps:

deriving a fourth rear steer angle command in open loop responsive to the measured longitudinal vehicle velocity and front steer angle;

deriving a fifth rear steer angle command in closed loop responsive at least to yaw rate error; and summing the fourth and fifth steer angle commands to produce the second steer angle command.

3. The method of claim 2 further comprising the step of storing separate first and second sets of data for determining desired yaw rate in closed loop control, wherein the step of determining a second rear steer angle command in closed loop comprises deriving a desired yaw rate from the first set of data and the step of determining a third rear steer angle command in closed loop comprises deriving a desired yaw rate from the second set of data.

4. The method of claim 1 further comprising the step of storing separate first and second sets of data for determining desired yaw rate in closed loop control, wherein the step of determining a second rear steer angle command in closed loop comprises deriving a desired yaw rate from the first set of data and the step of determining a third rear steer angle command in closed loop comprises deriving a desired yaw rate from the second set of data.

5. The method of claim 1 for a vehicle further having a second steerable rear wheel, wherein at least one of the steps of deriving a second rear steer angle command in closed loop responsive at least to yaw rate error and deriving a third rear steer angle command in closed loop responsive at least to yaw rate error further comprises deriving a commanded difference between the right and left wheel velocities for the rear wheels at least from a linear combination of at least two of (a) the yaw rate error, (b) a time derivative of the yaw rate error and (c) a time integral of the yaw rate error.

6. The method of claim 5 wherein the linear combination of at least two of (a) the yaw rate error, (b) a time derivative of the yaw rate error and (c) a time integral of the yaw rate error comprises gain factors stored as a function of estimated surface coefficient of friction.

7. The method of claim 5 wherein the linear combination of at least two of (a) the yaw rate error, (b) a time derivative of the yaw rate error and (c) a time integral of the yaw rate error comprises gain factors stored as a function of a sensed oversteer/understeer condition of the vehicle.

8. The method of claim 1 for a vehicle further having a second steerable rear wheel, wherein at least one of the steps of deriving a second rear steer angle command in closed loop responsive at least to yaw rate error and deriving a third rear steer angle command in closed loop responsive at least to yaw rate error further comprises deriving a commanded difference between the right and left wheel velocities for the rear wheels at least from a time integral of the yaw rate error, and wherein the time integral of the yaw rate error is reset to a predetermined value when the absolute value of the yaw rate error is less than a threshold value.

9. The method of claim 1 for a vehicle further having a second steerable rear wheel, wherein at least one of the steps of deriving a second rear steer angle command in closed loop responsive at least to yaw rate error and deriving a third rear steer angle command in closed loop responsive at least to yaw rate error further comprises deriving a commanded difference between the right and left wheel velocities for the rear wheels at least from a time integral of the yaw rate error, and wherein the time integral of the yaw rate error is reset to a predetermined value when the yaw rate error has a sign different from that of the time integral of the yaw rate error.

10. The method of claim 1 wherein the step of measuring a front steer angle further comprises the steps:

sensing a steering wheel angle $\delta_{SWA}$ of an operator steering control, and deriving the front steer angle by multiplying the sensed steering wheel angle by a factor representing a steering gear ratio $1/K_F$.

* * * * *